US009423260B2

United States Patent
Stählin

(10) Patent No.: US 9,423,260 B2
(45) Date of Patent: Aug. 23, 2016

(54) RATING OF MAP INFORMATION

(75) Inventor: Ulrich Stählin, Eschborn (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 13/637,544

(22) PCT Filed: Mar. 17, 2011

(86) PCT No.: PCT/EP2011/054023
§ 371 (c)(1),
(2), (4) Date: Sep. 26, 2012

(87) PCT Pub. No.: WO2011/117131
PCT Pub. Date: Sep. 29, 2011

(65) Prior Publication Data
US 2013/0024104 A1    Jan. 24, 2013

(30) Foreign Application Priority Data
Mar. 26, 2010  (DE) .......................... 10 2010 012 877

(51) Int. Cl.
G01C 21/30    (2006.01)
G01C 21/26    (2006.01)
G01C 21/28    (2006.01)

(52) U.S. Cl.
CPC ............... *G01C 21/26* (2013.01); *G01C 21/28* (2013.01); *B60W 2550/402* (2013.01); *G01C 21/30* (2013.01)

(58) Field of Classification Search
CPC combination set(s) only.
See application file for complete search history.

(56) References Cited

U.S. PATENT DOCUMENTS

| 8,150,593 | B2 | 4/2012 | Taki |
| 2002/0161513 | A1* | 10/2002 | Bechtolsheim et al. ...... 701/208 |
| 2007/0271036 | A1* | 11/2007 | Atarashi ...................... 701/211 |
| 2008/0249706 | A1 | 10/2008 | Brandai et al. |
| 2008/0270018 | A1* | 10/2008 | Citelli .......................... 701/200 |
| 2010/0161166 | A1* | 6/2010 | Yamada et al. ................ 701/22 |
| 2010/0217455 | A1 | 8/2010 | Stahlin et al. |
| 2010/0241354 | A1 | 9/2010 | Stählin et al. |
| 2011/0047338 | A1 | 2/2011 | Stahlin et al. |

FOREIGN PATENT DOCUMENTS

| CN | 101535103 | 9/2009 |
| DE | 101 49 285 A1 | 4/2003 |
| DE | 10 258 470 | 7/2004 |

(Continued)

*Primary Examiner* — John R Olszewski
*Assistant Examiner* — Gerrad A Foster
(74) *Attorney, Agent, or Firm* — Cozen O'Connor

(57) ABSTRACT

A rating of map information of self-learned maps with the aid of a method for producing, storing, and further using a digital map for a motor vehicle. Data relating to a first environment of the motor vehicle is captured using an ascertaining apparatus based on the ascertained data, a digital map of a first environment of the motor vehicle is produced and stored in a storage apparatus of the motor vehicle and rated using a first confidence indicator. A second confidence indicator is obtained from an electronic horizon. If the map information of the self-learned map matches the map information of the electronic horizon, the confidence indicator is raised to obtain a third confidence indicator of higher value and the map information can be used in a driver assistance system. However, if the data items do not match, the confidence indicators are lowered and transmission of the map information to the driver assistance system is blocked.

14 Claims, 2 Drawing Sheets

(56) References Cited

FOREIGN PATENT DOCUMENTS

| DE | 10 2006 057 153 A1 | 6/2007 |
|---|---|---|
| DE | 10 2008 046 683 | 3/2009 |
| DE | 10 2008 046 683 A1 | 3/2009 |
| DE | 10 2008 053 531 A1 | 5/2009 |
| DE | 10 2008 012 697 | 6/2009 |
| DE | 10 2008 012 697 A1 | 6/2009 |
| DE | 10 2009 017 731 A1 | 11/2009 |
| DE | 10 2009 017731 | 11/2009 |
| EP | 1 775 552 A2 | 4/2007 |

\* cited by examiner

RATING OF MAP INFORMATION

CROSS REFERENCE TO RELATED APPLICATION

This is a U.S. national stage of application No. PCT/EP2011/054023, filed on 17 Mar. 2011. Priority is claimed on German Application No. 10 2010 012 877.5, filed 26 Mar. 2010, the content of which is incorporated here by reference.

BACKGROUND OF THE INVENTION

1. Filed of the Invention

The invention relates to rating map information of digital maps using a method for the generation, storage, and further use of a digital map for a motor vehicle. In this context, data of at least one first environment of the motor vehicle is acquired by at least one locating device of the motor vehicle. From the data found, a digital map of a first environment of the motor vehicle is generated. This digital map is stored in a storage device of the motor vehicle and the generated digital map is rated with support by global navigation systems such as, e.g., GPS, Galileo, GLONASS (Russia), Compass (China), IRNSS (India) and provided for a driver assistance system (ADAS) of the motor vehicle.

2. Description of Related Art

Generating a self-learned map based on ambient environment sensors in conjunction with global navigation systems is known from DE 10 2009 017 731 A1. In addition, interfaces between navigation systems and driver assistance systems (ADAS) are already known for supplying the ADAS system with map data. Such interfaces are being standardized and need continuous improvement or implementation in existing engine management systems to warn a vehicle driver of hazards in the case of an electronically located vehicle environment, or to lower a vehicles speed automatically with the aid of the driver assistance system (ADAS) in the case of hazardous curves, track changes, or unrecognized driving into freeway exits.

Linking map information of self-learned map data with safety-related measures by driver assistance systems such as ADAS requires critical and continuous rating to be able to initiate safety-related measures with the driving operation without endangering by these electronic measures the vehicle itself, the passengers of the vehicle or third traffic users. To include informal data from a vehicle-to-vehicle and vehicle-to-environmental structure communication (C2X communication) into the driver assistance system and produce a connection to, for example, a distance control tempomat (ACC—adaptive cruise control), a radar sensor, a lidar sensor or laser scanner, respectively, a camera sensor system, and other communication units for the rating is a current requirement for channeling the flood of data and creating a reliable rating of vehicle situations.

In addition, the typical data from the vehicle sensor system such as wheel speed, yawing rate, steering wheel angle etc. must be taken into consideration for the driver assistance system in order to initiate, trigger, or use safety-related applications in the vehicle.

SUMMARY OF THE INVENTION

It is an object of one embodiment of the invention to channel and rate this flood of data information to derive safety-related measures that relate to the driving operation of the vehicle.

This object is achieved in that, apart from the known producing and providing of a learned digital map, an electronic horizon is provided that is integrated into a separate control device in the vehicle, wherein the control device combines the map data with the GPS, gyroscope, and wheel speed information and thus accurately calculates the respective driving position and builds a virtual road image. The most recent data packet in each case ensuring that the oldest data packet is removed from the memory of the control device.

The electronic horizon thus offers a basis of digital map data that takes into consideration a route lying ahead and its topography in engine control. The switching strategy can also be optimized by the electronic horizon in that the automatic system recognizes a curve lying ahead or an impending incline and correspondingly switches to a higher gear. Other examples of applications for the electronic horizon are adapted strategies in the case of distance-dependent tempomats (ACC, adaptive cruise control), recognition of traffic signs (fusion with camera), or curve warning device (warning against too high a speed before a curve). By the supportive character of the electronic horizon, the driver can thus decide at any time himself whether or not to utilize the recommendations of the driver assistance system to lower fuel costs, safely, and reach the destination more relaxed. The electronic horizon thus supports the acquisition and provision of a self-learned digital map due to its own vehicle sensor system.

The task of deciding between electronic horizon and the digital map provided is solved by the rating method according to one embodiment of the invention for the generation of further use of a digital map for the motor vehicle in that the subsequent method steps are carried out.

Firstly, a digital map and a first confidence indicator for the digital map is provided by a corresponding generating device of the motor vehicle. Additionally, determining of a second confidence indicator for the electronic horizon is carried out. Then, a first instantaneous position of the motor vehicle is determined and information for a second environment of the motor vehicle lying within the area of the first determined instantaneous position of the motor vehicle is provided and storing of the information in the electronic horizon is carried out.

This is followed by comparing the information provided in the electronic horizon with the generated digital map in the area of the second narrower environment of the motor vehicle. In dependence on the comparison of the provided information with the generated digital map, changing the first confidence indicator and the second confidence indicator is carried out and thus a third confidence indicator is determined from the first and the second confidence indicator. In the case of a successful rating by the third confidence indicator, using the generated digital map and/or the information provided in the electronic horizon is used in a driver assistance system of the motor vehicle in dependence on the third confidence indicator.

This method has the advantage that the switching strategy and the electronic energy and engine management system or other actuators of the driving dynamics are prevented when the self-generated map information with the information from the electronic horizon connected with the highest confidence indicator are secured so that there will not be any errors of performance of the driver assistance system which could have devastating consequences.

The providing of the digital map and of the first confidence indicator for the digital map is achieved by the following method steps. Firstly, data of at least one first environment of the motor vehicle are acquired by a locating device of the motor vehicle. Then, a digital map is generated from the determined data of the first environment of the motor vehicle. Subsequently, a first confidence indicator is established for the digital map and the generated digital map and the determined first confidence indicator are stored in a memory device of the motor vehicle. After that, the stored data can be compared with the electronic horizon.

In this context, the first confidence indicator and the second confidence indicator are lowered if the information provided in the electronic horizon does not correspond to the generated digital map in the area of the second environment of the motor vehicle. If, however, the information provided in the electronic horizon corresponds to the generated digital map in the area of the second environment of the motor vehicle, the first confidence indicator and the second confidence indicator are in each case raised. In the case of a change of the second confidence indicator, the first confidence indicator is used for calculating the changed second confidence indicator.

In addition, the determining of data of the first environment of the motor vehicle can be carried out repeatedly, the determined data being compared with one another, and a first confidence indicator being changed in each case, and rated higher, based on the comparison if the data are confirmed an nth time.

In a development of the safety-related method, the following steps are performed. Firstly, a second instantaneous position of the motor vehicle is determined. Then, the information about a third environment, lying within the area of the determined second instantaneous position of the motor vehicle is provided in the electronic horizon. The determining of a fourth confidence indicator is effected, wherein the fourth confidence indicator is determined by the second confidence indicator if no information of the generated digital map is available in the area of the determined second instantaneous position of the motor vehicle.

After that, using the information provided in the electronic horizon can be employed in the at least one driver assistance system of the motor vehicle in dependence on the fourth confidence indicator. In this method, it is assumed that no separate generated map information is available for the instantaneous second position of the motor vehicle so that the electronic horizon supports the driver assistance system of the vehicle alone.

On the other hand, it is also possible that the second confidence indicator is determined several times for the electronic horizon, a weighted mean value being formed from the determined values of the second confidence indicator to increase the reliability of the system. Furthermore, it is provided to determine a third instantaneous position of the motor vehicle in order to associate a fifth confidence indicator therewith, the fifth confidence indicator being determined by the first confidence indicator and the weighted mean value of the data of the electronic horizon, if there is no further information of the electronic horizon present in the area of the third environment of the motor vehicle. If this is the case, using the generated digital map in the at least one driver assistance system of the motor vehicle is employed in dependence on the at least fifth confidence indicator.

For generating a separate map, the motor vehicle has a locating device that provides at least one element selected from the group consisting of radar sensor, lidar sensor, optical sensor, acoustical sensor, and a position sensor. In addition, the motor vehicle preferably has a vehicle-to-vehicle or vehicle-to-environmental structure communication device, wherein the at least one locating device of the motor vehicle acquires data of the at least one first environment of the motor vehicle by data received from the vehicle-to-vehicle or vehicle-to-environmental structure communication device.

The vehicle-to-vehicle or vehicle-to-environmental structure communication device contributes to further rating and refining the digital map generated.

The motor vehicle preferably has a sensor and a data fusion device wherein topographic data of the second environment of the motor vehicle is determined by a sensor and wherein the generated digital map and the topographic data of the second environment of the motor vehicle are fused together by the data fusion device. Such a data fusion device has the advantage that only fused data is stored in the memory unit of the motor vehicle, which restricts the flood of data further and rates the data and increases their reliability.

In order to carry out this method, the motor vehicle has a first locating device for determining data of a first environment of the motor vehicle. Furthermore, it has a generating device for generating a digital map from the determined data of the first environment of the motor vehicle. In addition, the motor vehicle has a second locating device for determining a first confidence indicator for the digital map and a memory device for enabling the generated digital map and the determining of the first confidence indicator to be stored.

An arithmetic unit is provided to provide an electronic horizon for the motor vehicle. For this purpose, the motor vehicle has a third locating device for determining a second confidence indicator for the electronic horizon. By a fourth locating device, a first instantaneous position of the motor vehicle is determined. By a fifth locating device, information about a second environment of the motor vehicle, lying within the area of the determined first instantaneous position of the motor vehicle, is provided in the electronic horizon.

In addition, the motor vehicle has a comparing device to compare the information provided in the electronic horizon with the generated digital map in the area of the second environment of the motor vehicle. A changing device is provided for changing the first confidence indicator and the second confidence indicator based on the comparison of the provided information with the generated digital map. A sixth locating device is constructed for determining a third confidence indicator from the first confidence indicator and the second confidence indicator.

Finally, a driver assistance system is available in the motor vehicle to use the generated digital map and/or the information provided in the electronic horizon based on the third confidence indicator.

To carry out these ratings and provide only safeguarded data for the vehicle assistance system, the control device of the vehicle has a computer program executed on a processor of an arithmetic device of a motor vehicle. In this context, the computer program instructs the arithmetic device for carrying out the following method steps. Firstly, data of a first environment of the motor vehicle is determined by a first locating device of the motor vehicle. After that, a digital map is generated from the determined data of the one first environment of the motor vehicle by a generating device.

Next, a first confidence indicator is determined for the digital map by a second locating device. Furthermore, the computer program provides that the generated digital map and the determined first confidence indicator are stored in a memory device. In parallel, an electronic horizon is provided for the motor vehicle in an arithmetic unit of the motor vehicle. In this context, a second confidence indicator is determined for the electronic horizon by a third determining device. Furthermore, the computer program provides that a first instantaneous position of the motor vehicle is acquired by a fourth locating device.

After that, information about a second environment of the motor vehicle, lying within the area of the determined first instantaneous position of the motor vehicle, is provided in the electronic horizon by a fifth locating device. The computer program then provides that the information provided in the electronic horizon is compared with the generated digital map in the area of the second environment of the motor vehicle by a comparing device.

This is followed by changing the confidence indicator and the second confidence indicator based on the comparison of the provided information with the generated digital map with the aid of a changing device. Finally, a third confidence indicator is determined by the first confidence indicator and the second confidence indicator via a sixth locating device and then the generated digital map and/or the information provided in the electronic horizon are used in a driver assistance system of the motor vehicle based on the third confidence indicator.

This computer program ensures that after three rating stages which are, adapted to the result of the ratings, the switching system of the vehicle, or the energy management system of the vehicle is engaged via the driver assistance system. This requires that a computer-readable medium, on which such a computer program is stored, is provided in the vehicle.

By this system, the problem of lacking actual map data is overcome in that instantaneous positions of the motor vehicle are determined by self-learned map systems and additionally calibrated with the aid of the electronic horizon. This creates the redundancy of information necessary or safety application, and rates the map information, either of the electronic horizon or of the self-generated environment before these are provided to a driver assistance system.

To provide further explanation of the embodiments of the methods and devices according to the invention, examples will now be described.

DETAILED DESCRIPTION OF THE PREFERRED EMBODIMENTS

Figure 1:
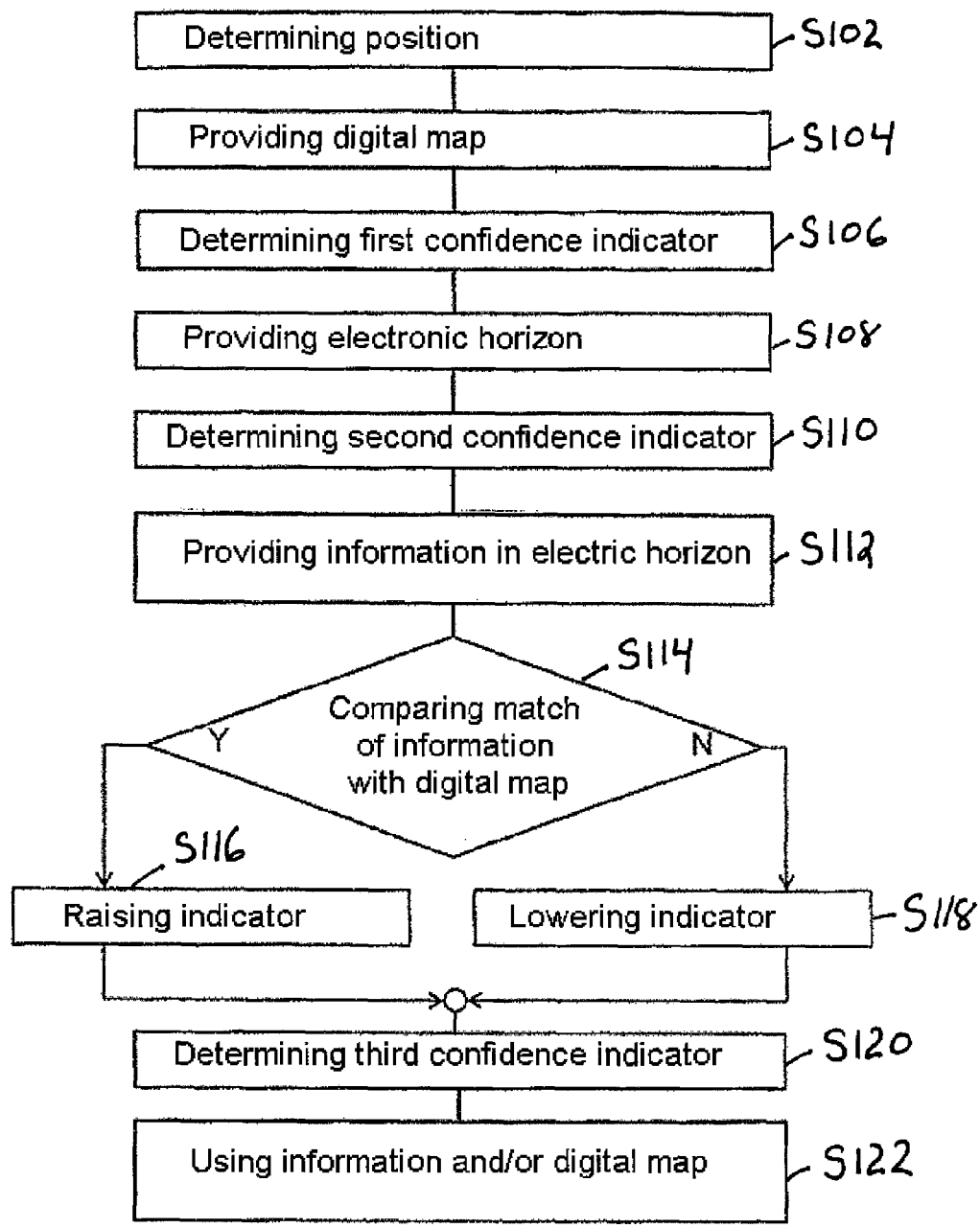
FIG. 1 is a flow chart of a method for rating map information.
Figure 2:
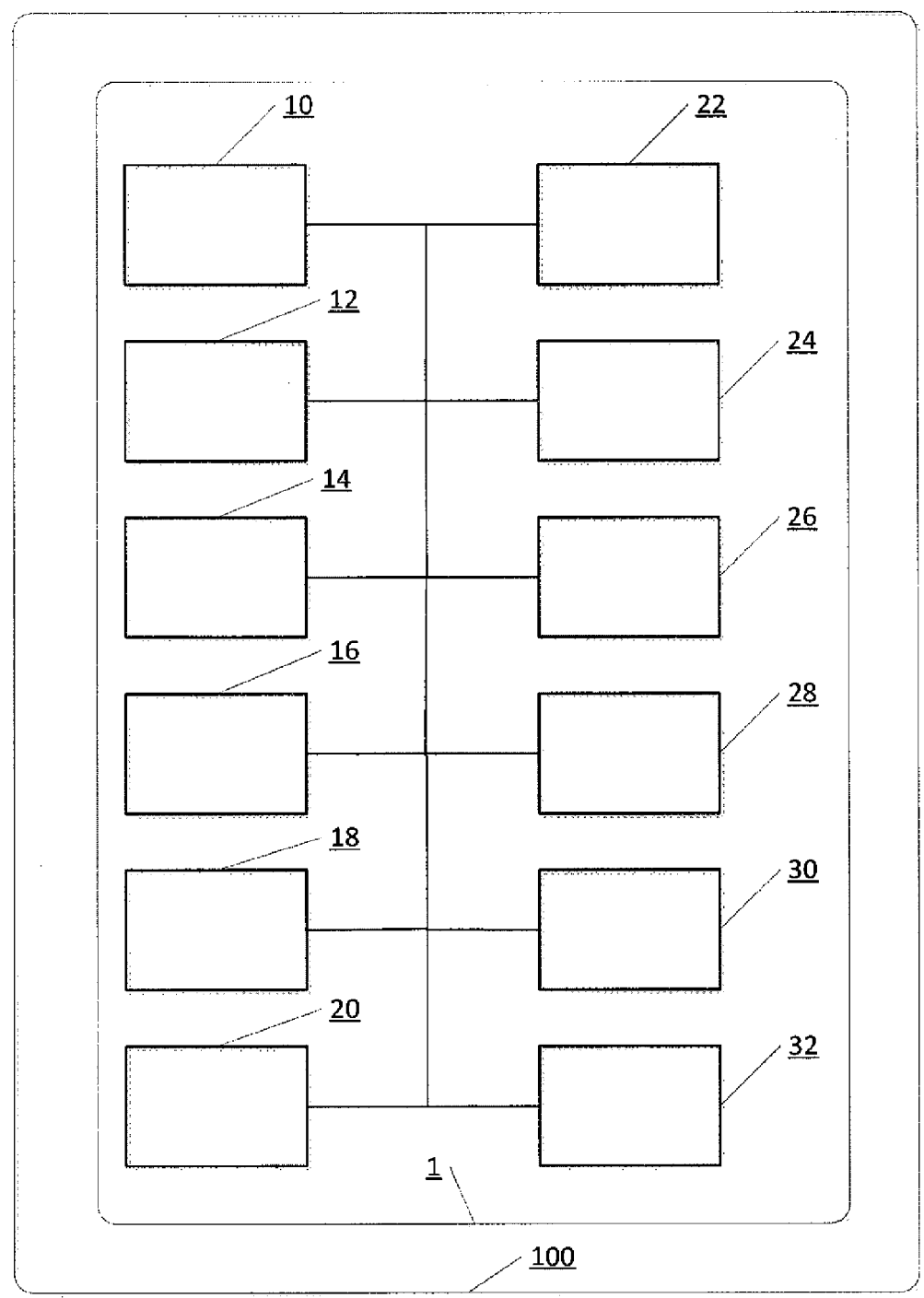
FIG. 2 is a vehicle equipped with a system for rating map information.

In one embodiment, a map of the routes already travelled by the vehicle is generated from vehicle data. This data is stored in a separate digital map. When travelling along a route, the self-learned information from the self-provided digital map is compared with that from an electronic horizon. If both types of information are equal, the map information is given a large confidence indicator. This information is additionally also included in an overall indicator for the electronic horizon such as, for example, a weighted mean value of the confidence indicator by the previously checked route or weighted mean values of the confidence indicator over the last checks, more recent checks being rated higher than less recent checks.

If, however, there is no self-learned map at one place, the overall indicator of the electronic horizon is used for locating the confidence indicator. However, the confidence indicator thus located cannot be as high as the confidence indicator with an existing self-learned map of the vehicle.

If, however, there is no data from the electronic horizon at one place because, e.g., no electronic horizon is available, the confidence indicator from the time since the last travelling of the route and of the correlation of the previous measurements is determined.

If the electronic horizon and self-learned map contradict each other, the self-learned map is trusted more but, for safety reasons, a lower third confidence indicator is forwarded. In addition, the overall confidence indicator of the electronic horizon is degraded with the aid of the method steps already explained above.

The self-learned map has its own first confidence indicator. This is determined by storing how often the route has already been travelled and how often the learned information was confirmed in this process. If a change is recognized, the first confidence indicator is set back to the starting value but the old route is still stored. If a change is recognized again after some time, a check is made whether the old route is valid again. If the check is yes, the first confidence indicator last valid for the old route is used for starting, if the check is no, the old route is discarded conclusively.

After a comparison, the data is ideally supplied to a sensor fusion. The map data can be used there for supporting ambient environment sensor data of a camera, a radar and/or a lidar. The sensor fusion can additionally also be used for checking whether the map data is correct in that, e.g., a camera can detect the course of the track and whether it corresponds to the map. In addition, e.g., a camera can also supply additional data such as, e.g., recognized traffic signs. If necessary, the sensor fusion provides a correction or addition back to the learned map and, if necessary, can also degrade the confidence in the electronic horizon.

Some route sections may be changed only temporarily in the traffic routing, e.g. at construction sites. In the case of freeway construction sites, these could be detected by typical driving patterns or sensor fusion data can also be used. In addition, such changes in the road traffic can be confirmed by the driver and the latter may even specify a validity period of the change. After this validity period, the old course of the road applies again, and thus the old map.

The electronics can also learn what the average speed is in an area at a certain time of the day for a driver, and based on this, system thresholds can be adapted. It is possible to determine the type of road, class of road, permitted direction of travel etc. especially with the aid of ambient environment sensor data, speeds, and data from the vehicle-to-vehicle or vehicle-to-environmental structure communication. It is therefore possible to offer either new driver assistance systems, for example for a curve warning device, or to improve old ones such as, e.g., the ACC method.

In summary, the following advantages of an embodiment of the invention can be noted. The invention uses ambient environment sensors that supply data for mapping but which data has hitherto not been stored and is thus lost. Thus, the following ambient environment sensors are used advantageously for generating self-provided maps, and their data stored:

1. From GPS positions, the vehicle's lane is determined, and thus a basis for the road determination.
2. The vehicle's lane can also be determined from vehicle dynamics sensors, but only relative to a respective starting point. This information is, therefore, linked ideally to the GPS positions.
3. In the case of the vehicle interval radar (ACC—adaptive cruise control), the vehicle interval radar generates a track estimation even today which can also be used as the basis for recognizing a lane.
4. By the camera sensor system, lanes and traffic signs can be recognized and stored.

5. By vehicle-to-vehicle communication or vehicle-to-environmental structure communication, the positions of other vehicles and thus even roads and lanes that cannot be travelled can be detected.

The data that is already available and is to be stored can be supported by the vehicle sensor system such as wheel speeds, yawing rate, steering wheel angle etc. and vehicle models based on these. Furthermore, it is possible also to merge the environmental data since each sensor has peculiarities, strengths and weaknesses that can be taken into consideration in a merger and the total result thus becomes more reliable and is improved. A map generated from this data by the control device of the motor vehicle itself can be refined further if a route is travelled repeatedly. This also enables one to adapt relatively quickly to changes of the routes.

In this context, FIG. 1 is a flow chart of a preferred method for rating or validating a self-generated digital map and an electronic horizon provided. In this context, the position of the vehicle is first determined (S102), as shown in FIG. 1, and then a digital map is provided (S104) and a first confidence indicator is determined (S106). By providing an electronic horizon (S108), a second confidence indicator is determined (S110) and information in the electronic horizon is provided (S112). If there is correspondence between the information of the digital horizon and the self-provided digital map (S114), the second confidence indicator is raised (S116). If this correspondence does not exist, the second confidence indicator is degraded (S118). When the indicator is raised, a third confidence indicator is defined (S120) and the use of information of the digitally generated map is released for a driver assistance system (S122).

Next, three performance examples for the use of the methods described above are described.

In a first example, a vehicle travels a new route for the first time. The electronic horizon has reached a certain basic confidence level due to the previous trips. For this reason, the ACC radar still uses the data of the electronic horizon. On the freeway, a speed of 150 km/h is set for the ACC but due to the traffic, it is only possible to travel at 100 km/h which is also adjusted correspondingly by the ACC. Before a freeway exit, the driver veers out to the right towards the exit lane and, as a result, no longer has a vehicle in front of him. Since, however, the electronic horizon shows that this is a lane change to an exit lane of the freeway, the ACC does not accelerate in spite of the speed of 150 km/h set and, instead, reduces its speed to 80 km/h because this is the suitable speed for the coming exit curve of the freeway exit.

In a second example, a driver travels the same commuting route every day and thus has a very well-learned map of this route. The electronic horizon and self-learned map have previously always corresponded and all driver assistance systems (ADAS) were therefore able to use the map data fully.

On one trip, there is a new construction site on the route. This is determined during the learning of the self-generated map, resulting in a discrepancy between the self-generated learned map and electronic horizon for which reason the map data are no longer used for the driver assistance system (ADAS). In addition, the learning algorithm recognizes that this is a typical freeway construction site because there is a lane change to the opposite lane and therefore continues to remember the old course for when the construction site is removed. On the next day, the construction site is still present and there is again a discrepancy between the electronic horizon and self-learned map. Since, however, the self-learned map still exists this time and has a low confidence level, the ADAS functions can use the map data from the self-learned map for a certain proportion. However, the full extent of map utilization is not available and safety instructions cannot use this map data.

In a third example of an ITS (Intelligent Transport System), one system element is used for preprocessing vehicle-to-vehicle and vehicle-to-environmental structure data (C2X communication data). For this reason, GPS data and vehicle dynamics data are also used in the system element. This therefore provides the option of combining the system element for preprocessing constructionally with the module for map rating described. Thus, C2X data (vehicle-to-vehicle or vehicle-to-environmental structure data) can also be used easily for learning the map and/or the learned map used for validating the C2X data.

In another variant, the system element can be used for preprocessing in ITS as supplier of the learned maps wherein the comparison can be made in another control device, e.g. where the data are to be used.

In one embodiment a motor vehicle has a first locating device 10 that determines data of at least one first environment 100 of the motor vehicle. A generating device 12 is configured to generate a digital map from the determined data of the at least one first environment of the motor vehicle. A second locating device 14 determines at least one first confidence indicator for the digital map. A memory device 16 stores the generated digital map and the determined at least one first confidence indicator. An arithmetic unit 18 provides an electronic horizon for the motor vehicle. A third locating device 20 determines at least one second confidence indicator for the electronic horizon. A fourth locating device 22 determines a first instantaneous position of the motor vehicle. A fifth locating device 22 provides information about a second environment of the motor vehicle, lying within the area of the determined first instantaneous position 100 of the motor vehicle, in the electronic horizon. A comparing device 26 compares the information provided in the electronic horizon with the generated digital map in the area of the second environment of the motor vehicle. A changing device 28 changes the at least one first confidence indicator and the at least one second confidence indicator based at least in part on the comparison of the provided information with the generated digital map. A sixth locating device 30 determines at least one third confidence indicator by the at least one first confidence indicator and the at least one second confidence indicator. A driver assistance system 32 uses the generated digital map and/or the information provided in the electronic horizon based at least in part on the at least one third confidence indicator.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for generating and using a digital map for a motor vehicle, comprising:
    providing a digital map and at least one first confidence indicator for the digital map by at least one device of the motor vehicle, wherein the first confidence indicator is based at least in part on at least one of a time since the last traversal of the route and how often the route is confirmed;
    providing an electronic horizon for the motor vehicle in at least one arithmetic unit of the motor vehicle;
    determining in the at least one arithmetic unit of the motor vehicle at least one second confidence indicator for the electronic horizon;
    determining a first instantaneous position of the motor vehicle;
    providing information about an area of a second environment of the motor vehicle, the area of the second environment lying within an area of the determined first instantaneous position of the motor vehicle;
    storing the information in the electronic horizon, wherein only a most recent information is stored;
    removing prior information from the electronic horizon so that only the most recent information is stored;
    comparing the information stored in the electronic horizon with a generated digital map in the area of the second environment of the motor vehicle;
    changing the at least one first confidence indicator and an at least one second confidence indicator based at least in part on the comparison of the information with the generated digital map;
    comparing the at least one first confidence indicator and the at least one second confidence indicator;
    determining at least one third confidence indicator based on the comparison of the at least one first confidence indicator and the at least one second confidence indicator; and
    using at least one of the generated digital map and the information in at least one driver assistance system of the motor vehicle based at least in part on the at least one third confidence indicator to control at least one of an engine and a transmission of the motor vehicle,
    wherein the at least one of the generated digital map and the information in at least one driver assistance system of the motor vehicle is used only after the first, second, and third confidence indicators are determined.

2. The method as claimed in claim 1, wherein the providing the digital map and the at least one first confidence indicator for the digital map comprises:
    determining first data of at least one first environment of the motor vehicle by at least one locating device of the motor vehicle;
    generating the digital map from the determined first data of an at least one first environment of the motor vehicle;
    determining the at least one first confidence indicator for the digital map; and
    storing the generated digital map and the at least one first confidence indicator in a memory device of the motor vehicle.

3. The method as claimed in claim 2, further comprising lowering the at least one first confidence indicator and the at least one second confidence indicator if the information provided in the electronic horizon does not correspond to the generated digital map in the area of the second environment of the motor vehicle; and
    raising the at least one first confidence indicator and the at least one second confidence indicator if the information provided in the electronic horizon corresponds to the generated digital map in the area of the second environment of the motor vehicle.

4. The method as claimed in claim 1, wherein in a case of a change of the at least one second confidence indicator, the at least one first confidence indicator is used for calculating the changed second confidence indicator.

5. The method as claimed in claim 2, wherein the determining of data of the at least one first environment of the motor vehicle is carried out repeatedly and wherein the determined first data is compared with one another and wherein the at least one first confidence indicator is changed based at least in part on the comparison.

6. The method as claimed in claim 2, wherein the method comprises:
    determining a second instantaneous position of the motor vehicle;
    providing information about a third environment of the motor vehicle within an area of the determined second instantaneous position of the motor vehicle in the electronic horizon;
    determining at least one fourth confidence indicator, wherein the at least one fourth confidence indicator is determined by the at least one second confidence indicator if no information of the generated digital map is available in the area of the determined second instantaneous position of the motor vehicle;
    using the information provided in the electronic horizon in the at least one driver assistance system of the motor vehicle based at least in part on the at least one fourth confidence indicator.

7. The method as claimed in claim 1, further comprising:
    determining the at least one second confidence indicator two or more times for the electronic horizon; and
    forming a weighted mean value from the determined values of the at least two second confidence indicator.

8. The method as claimed in claim 7, further comprising:
    determining a third instantaneous position of the motor vehicle;
    determining at least one fifth confidence indicator,
    wherein the at least one fifth confidence indicator is determined based at least in part on the at least one first confidence indicator and the weighted mean value if there is no information of the electronic horizon present in the area of a third environment of the motor vehicle; and
    using the generated digital map in the at least one driver assistance system of the motor vehicle in dependence on the at least one fifth confidence indicator.

9. The method as claimed in claim 2, wherein the at least one locating device of the motor vehicle contains at least one of a radar sensor, a lidar sensor, an optical sensor, an acoustical sensor and a position sensor.

10. The method as claimed in claim 2, wherein the motor vehicle has a vehicle-to-vehicle communication device and wherein the at least one locating device of the motor vehicle determines data of the at least one first environment of the motor vehicle based at least in part on data received from the vehicle-to-vehicle communication device.

11. The method as claimed in claim 1, wherein the motor vehicle has a vehicle-to-vehicle communication device and wherein data received by the vehicle-to-vehicle communication device is validated by the generated digital map.

12. The method as claimed in claim 2, wherein the motor vehicle has at least one sensor and one data fusion device and wherein topographic data of the second environment of the motor vehicle are determined based at least in part on the at least one sensor and wherein the generated digital map and the topographic data of the second environment of the motor vehicle are fused together by a data fusion device.

13. A motor vehicle comprising:
- a first locating device configured to determine data of at least one first environment of the motor vehicle;
- a generating device configured to generate a digital map from the determined data of the at least one first environment of the motor vehicle;
- a second locating device configured to determine at least one first confidence indicator for the digital map, wherein the first confidence indicator is based at least in part on at least one of a time since the last traversal of the route and how often the route is confirmed;
- a memory device configured to store the generated digital map and the determined at least one first confidence indicator, wherein only a most recent data is stored;
- an arithmetic unit configured to provide an electronic horizon for the motor vehicle;
- a third locating device configured to determine at least one second confidence indicator for the electronic horizon;
- a fourth locating device configured to determining a first instantaneous position of the motor vehicle;
- a fifth locating device configured to provide information about a second environment of the motor vehicle within the area of the determined first instantaneous position of the motor vehicle in the electronic horizon;
- a comparing device configured to compare the information provided in the electronic horizon with the generated digital map in the area of the second environment of the motor vehicle;
- a changing device configured to change the at least one first confidence indicator and the at least one second confidence indicator based at least in part on the comparison of the provided information with the generated digital map;
- a sixth locating device configured to determine at least one third confidence indicator based on a comparison of the at least one first confidence indicator and of the at least one second confidence indicator; and
- a driver assistance system configured to use at least one of the generated digital map and the information provided in the electronic horizon based at least in part on the at least one third confidence indicator to control at least one of an engine and a transmission of the motor vehicle,
- wherein the at least one of the generated digital map and the information in at least one driver assistance system of the motor vehicle is used only after the first, second, and third confidence indicators are determined.

14. A computer program stored on a nontransitory computer-readable medium which, when it is executed on a processor of an arithmetic device of a motor vehicle, instructs the arithmetic device to perform the following method:
- determine data of at least one first environment of the motor vehicle based at least in part on at least one first locating device of the motor vehicle;
- generate a digital map from the determined data of the at least one first environment of the motor vehicle by means of a generating device;
- determine at least one first confidence indicator for the digital map based at least in part on a second locating device, wherein the first confidence indicator is based at least in part on a time since the last traversal of the route and how often the route is confirmed;
- store the generated digital map and the determined at least one first confidence indicator in a memory device, wherein only a most recent data is stored;
- remove prior data from the memory device so that only the most data is stored;
- provide an electronic horizon for the motor vehicle in at least one arithmetic unit of the motor vehicle;
- determine at least one second confidence indicator for the electronic horizon based at least in part on a third locating device;
- determine a first instantaneous position of the motor vehicle based at least in part on a fourth locating device;
- provide information about a second environment of the motor vehicle, lying within the area of the determined first instantaneous position of the motor vehicle, in the electronic horizon by means of a fifth locating device;
- compare the information provided in the electronic horizon with the generated digital map in the area of the second environment of the motor vehicle based at least in part on a comparing device;
- change the at least one first confidence indicator and the at least one second confidence indicator in dependence on the comparison of the provided information with the generated digital map by a changing device;
- comparing the at least one first confidence indicator and the at least one second confidence indicator;
- determine at least one third confidence indicator based at least in part on the comparison of the at least one first confidence indicator and the at least one second confidence indicator by a sixth locating device; and
- use the generated digital map and/or the information provided in the electronic horizon in at least one driver assistance system of the motor vehicle based at least in part on the at least one third confidence indicator to control at least one of an engine and a transmission of the motor vehicle,
- wherein the at least one of the generated digital map and the information in at least one driver assistance system of the motor vehicle is used only after the first, second, and third confidence indicators are determined.

* * * * *